May 22, 1934. F. G. BEETEM 1,960,199
APPARATUS FOR CONTROLLING THE CHARGE OF A STORAGE BATTERY
Filed Nov. 3, 1930
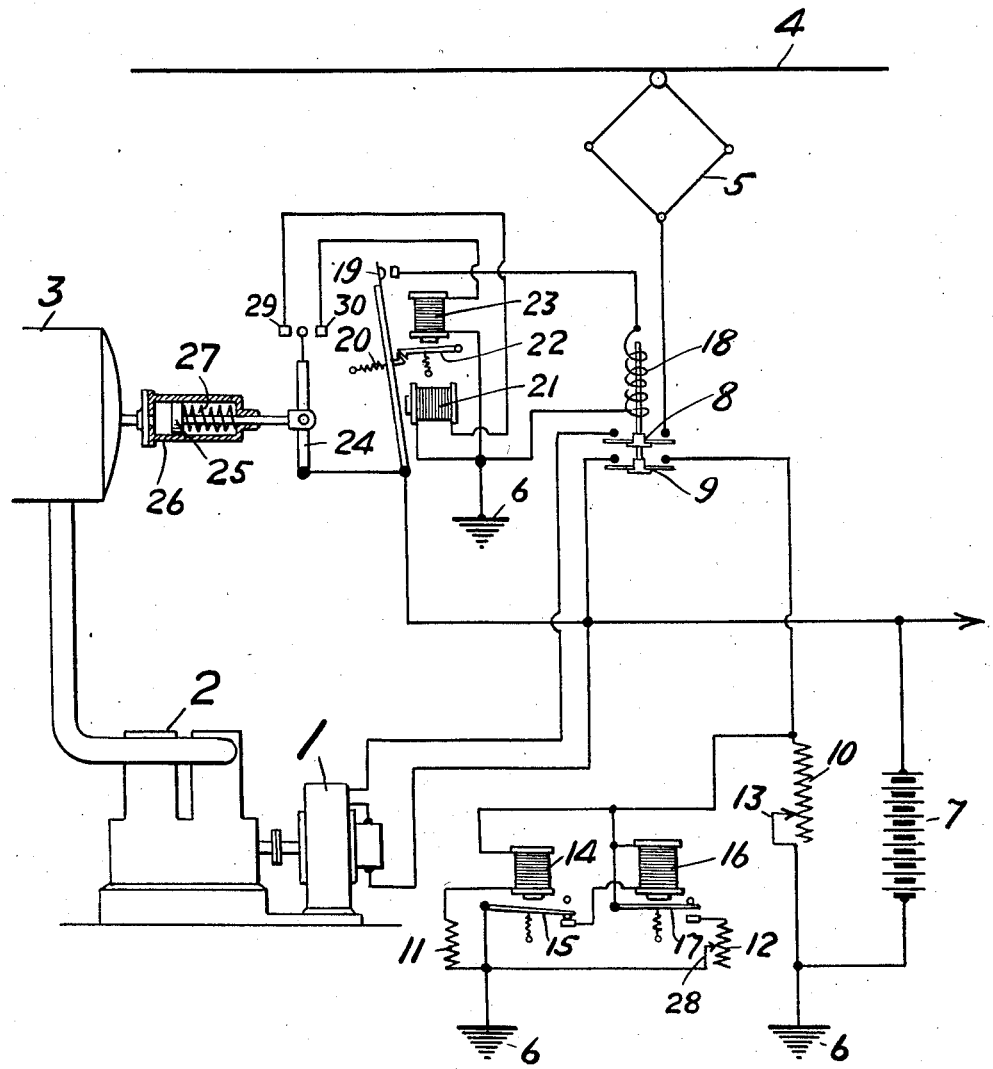
INVENTOR
Frank G. Beetem
BY
Augustus B. Stoughton.
ATTORNEY.
WITNESS:

Patented May 22, 1934

1,960,199

UNITED STATES PATENT OFFICE 1,960,199

APPARATUS FOR CONTROLLING THE CHARGE OF A STORAGE BATTERY

Frank G. Beetem, Philadelphia, Pa., assignor to The Electric Storage Battery Company, Philadelphia, Pa., a corporation of New Jersey Application November 3, 1930, Serial No. 492,922

5 Claims. (Cl. 171—314)

The apparatus, which is the subject of my invention, is designed to control the charge of a storage battery, which is connected in series with the direct current motor used for driving the air compressor which furnishes compressed air for the operation of brakes and other pneumatic devices on a trolley car, and the object of the invention is to so control the amount of charging current as to meet the requirements of the battery.

In systems of this kind, the operation of the compressor motor is intermittent, being controlled by the pressure of the air in the tank. The amount of current passing through the motor armature and the battery, which are connected in series, is therefore quite variable. Furthermore, the load on the battery varies from time to time. It has been customary in systems of this kind to connect a resistance in parallel with the battery whenever the compressor motor is in operation in order to divert a part of the current passing through the motor and thus avoid excessive charge. This resistance may be adjustable manually but it is always difficult to maintain the proper adjustment to meet the varying operating conditions. One object of the present invention is to provide automatic means responsive to the voltage of the battery for effecting this adjustment.

For a more complete exposition of my invention reference may be had to the annexed drawing and specification at the end whereof the invention will be specifically pointed out and claimed.

The drawing shows a single diagrammatic figure of my invention.

In the embodiment of my invention chosen for illustration in the drawing there is disclosed an electric motor 1 which is adapted to drive an air compressor 2 which stores air under pressure in tank 3. Electric power for the operation of motor 1 is drawn from the third rail or wire 4 by means of trolley, brush or pantograph 5. Connected in series with motor 1 across the line 4 and the ground 6, which together form a charging source, is storage battery 7.

In the connection between the motor 1 and storage battery 7 and the ground 6 is interposed a switch 8. Connected to switch 8 and operating simultaneously therewith is a switch 9 which is adapted to connect across the battery four parallel connected circuits comprising respectively the resistance 10, the resistance 12, the magnet coil 16, and the magnet coil 14 with its series resistance 11. Resistance 10 is the main resistance which may be manually adjusted, as required, by the sliding contact 13. Resistance 12 is an auxiliary resistance which may also be manually adjusted by the sliding contact 28 for any particular set of conditions. Magnet coil 14, which is connected across the battery 7 through resistance 11 whenever the switch 9 is closed, controls the switch 15 in response to the battery voltage, opening its contacts when the battery voltage increases to a predetermined value. Resistance 11 has a low or zero temperature coefficient and is inserted to minimize the effect of temperature changes on coil 14. Switch 15 is biased to closed position by a spring or in any other suitable manner. Switch 15 in turn is connected in series with coil 16, which controls switch 17, whose contacts are in series with resistance 12.

Switches 8 and 9 are adapted to be actuated by magnetic coil 18 which is connected in series with switch 19 across storage battery 7. Switch 19 is stressed to open position by spring 20 or in any other convenient manner. There is provided adjacent switch 19 closing coil 21 which is adapted to move switch 19 to closed position. There is provided latch 22 which holds switch 19 in closed position. Adjacent latch 22 there is provided a tripping coil 23. Coils 21 and 23 are adapted to be, either one or the other, connected across storage battery 7 by pressure switch 24 which moves in response to the pressure in tank 3 under the actuation of piston 25 and cylinder 26. Spring 27 tends to oppose the pressure in tank 3.

It is believed that the operation of my improved system is apparent from an inspection of the drawing in connection with the foregoing description of the parts. When the air pressure in tank 3 falls to a predetermined amount switch 24 moves to the left thereby connecting closing coil 21 which closes switch 19 which in turn closes switches 8 and 9. The motor 1 and the storage battery 7 are thus connected in series across the line 4 and ground 6. The closing of switch 9 also connects resistance 10 in parallel with the battery and in shunt therewith coils 14 and 16. The current passing through motor 1 is thus divided between the battery 7 and the resistor 10 (except for the small amount passing through coils 14 and 16) and by suitable adjustment of resistor 10, the proportion of this current passing through the battery may be adjusted to the value desired for the beginning of the charging period. When the voltage of the battery 7 increases to a predetermined value, coil 14 actuates switch 15, which in turn breaks the circuit of coil 16 and permits switch 17 to close, thus connecting resistance 12 in parallel with resistance 10, thereby diverting an increased proportion of the motor current from the battery, preventing the battery from receiving abusive overcharge. This condition remains until either the voltage of the battery 7 decreases sufficiently to weaken the excitation of coil 14 to a point where it will allow switch 15 again to close, resulting in the opening of switch 17 and the restoration of the original condition; or the air pressure in the tank 3, having reached its upper predetermined limit moves switch 24 to the right, opening the contact at 29 and closing the contact at 30, thus exciting coil 23, lifting the latch 22 and opening contact 19. This opens the circuit of coil 18, thereby opening switches 8 and 9, interrupting the current through the motor 1 and battery 7, disconnecting coils 14 and 16, thereby restoring the initial conditions for the next cycle If the current taken by the motor 1 is not too great, the resistor 10 may be omitted, permitting substantially the entire motor current to pass through the battery during the first part of the charging cycle.

From the foregoing it will be apparent that my invention is not limited to the exact embodiment shown nor do I intend to be limited save as the scope of the prior art and of the attached claims may require.

I claim:

1. Apparatus for controlling the charge of a storage battery comprising, a source of electricity, a storage battery, a motor connected in series with said battery, a main switch controlling the connection of said battery and said motor to said source, a pressure switch controlling the operation of said main switch, a resistance, a coil connected in parallel with said resistance, a switch actuated by said coil, high resistance circuit connections controlled by said last mentioned switch in parallel with said resistance for paralleling said resistance, and auxiliary contacts on said main switch controlling the connection of said resistance and said coil, and said high resistance circuit connections in parallel with said battery.

2. In a storage battery charging system, a storage battery, a source of current at a voltage in considerable excess of that required to charge said battery, a translating device connected in series with said storage battery, a main switch controlling connection of said device and said storage battery to said source, a diverting resistance, a first coil connected in parallel with said resistance, a switch controlled by said first coil, a second coil having connection controlled by said last mentioned switch in parallel with said resistance and with said first coil, a resistor circuit connection in parallel with said resistance and with said first coil and with said second coil, a resistor in said resistor circuit connection, a switch operated by said second coil controlling said resistor circuit connection, and auxiliary contacts on said main switch controlling the connection of said resistance and said first coil and said second coil and said resistor circuit connection in parallel with said battery.

3. In a storage battery charging system, a storage battery, a source of current at a voltage in considerable excess of that required to charge said battery, a translating device connected in series with said storage battery, a main switch controlling connection of said device and said storage battery to said source, a diverting resistance, a coil connected in parallel with said resistance, a high resistance circuit connection, a switch actuated by said coil controlling the connection of said high resistance circuit connection in parallel with said resistance and with said coil, and auxiliary contacts on said main switch controlling the connection of said resistance and said coil and said high resistance circuit connection in parallel with said battery.

4. In a storage battery charge control system, the combination of a charging source, a storage battery and a motor connected in series, a switch adapted to connect the battery and motor to the source and simultaneously to connect across the battery four parallel circuits whereof the first includes the exciting coil of a relay whose contacts are adapted to be opened at a predetermined battery voltage applied to said coil and whereof the second circuit includes in series the contacts of the said relay and the exciting coil of a second relay whose contacts are adapted to be opened when its exciting coil is subjected to any battery voltage within the normal operating range, and whereof the third circuit includes in series the contacts of the second relay and a resistor, and whereof the fourth circuit includes a resistor.

5. In a storage battery charge control system, the combination of a charging source, a storage battery and a motor connected in series, a switch adapted to connect the battery and motor to the source and simultaneously to connect across the battery three parallel circuits whereof the first includes the exciting coil of a relay whose contacts are adapted to be opened at a predetermined battery voltage applied to said coil, and whereof the second circuit includes in series the contacts of the said relay and the exciting coil of a second relay whose contacts are adapted to be opened when its exciting coil is subjected to any battery voltage within the normal operating range, and whereof the third circuit includes in series the contacts of the second relay and a resistor.

FRANK G. BEETEM.